US008194348B2

(12) United States Patent
Jacoby et al.

(10) Patent No.: US 8,194,348 B2
(45) Date of Patent: Jun. 5, 2012

(54) SEALED LAMINATED ELECTRICAL CONNECTOR FOR HELIUM FILLED DISK DRIVE

(75) Inventors: Jon E. Jacoby, San Jose, CA (US); John R. Gustafson, Los Gatos, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 224 days.

(21) Appl. No.: 12/714,328

(22) Filed: Feb. 26, 2010

(65) Prior Publication Data

US 2011/0211279 A1    Sep. 1, 2011

(51) Int. Cl.
    G11B 33/14    (2006.01)

(52) U.S. Cl. ............... 360/99.25; 360/97.21; 360/99.21

(58) Field of Classification Search ............... 360/97.01, 360/97.02, 97.03, 98.01, 264.2, 266.3, 97.11, 360/97.21, 99.15, 99.16, 99.21, 99.23, 99.24, 360/99.25
See application file for complete search history.

(56) References Cited

U.S. PATENT DOCUMENTS

| 5,097,978 | A | 3/1992 | Eckerd |
| 5,270,887 | A | 12/1993 | Edwards et al. |
| 5,276,577 | A | 1/1994 | Brooks et al. |
| 5,454,157 | A | 10/1995 | Ananth et al. |
| 5,600,509 | A | 2/1997 | Kawakami |
| 5,646,801 | A | 7/1997 | Boigenzahn et al. |
| 6,185,807 | B1 | 2/2001 | Kazmierczak et al. |
| 6,266,207 | B1 | 7/2001 | Iwahara et al. |
| 6,347,021 | B2 | 2/2002 | Kazmierczak et al. |
| 6,392,838 | B1 | 5/2002 | Hearn et al. |
| 6,525,899 | B2 | 2/2003 | Hearn et al. |
| 6,556,372 | B2 | 4/2003 | Hearn et al. |
| 6,631,049 | B2 | 10/2003 | Satoh et al. |
| 6,721,128 | B1 | 4/2004 | Koizumi et al. |
| 6,822,823 | B1 | 11/2004 | Tsuwako et al. |
| 6,903,898 | B2 | 6/2005 | Nonaka et al. |
| 6,970,322 | B2 | 11/2005 | Bernett |
| 6,989,493 | B2 | 1/2006 | Hipwell, Jr. et al. |
| 7,016,145 | B2 | 3/2006 | Gunderson et al. |
| 7,019,942 | B2 | 3/2006 | Gunderson et al. |
| 7,123,440 | B2 | 10/2006 | Albrecht et al. |
| 7,355,811 | B1 | 4/2008 | Gifford et al. |
| 7,365,937 | B2 | 4/2008 | Gunderson |
| 7,434,987 | B1 | 10/2008 | Gustafson et al. |
| 7,522,375 | B2 | 4/2009 | Tsuda et al. |
| 7,599,147 | B2 | 10/2009 | Gunderson |
| 2001/0044023 | A1 | 11/2001 | Johnson et al. |
| 2003/0081348 | A1 | 5/2003 | Watanabe et al. |
| 2003/0179489 | A1 | 9/2003 | Bernett et al. |
| 2005/0068666 | A1 | 3/2005 | Albrecht et al. |
| 2005/0184463 | A1 | 8/2005 | Boutaghou et al. |
| 2005/0253343 | A1 | 11/2005 | Hampton |
| 2006/0002005 | A1 | 1/2006 | Miyazaki et al. |
| 2006/0034010 | A1 | 2/2006 | Abe et al. |

(Continued)

*Primary Examiner* — Craig A. Renner

(57) ABSTRACT

A novel disk drive includes a hermetically sealed helium-filled enclosure that has an opening extending through the disk drive base. A laminated electrical connector is disposed inside the enclosure, spans the opening, and is accessible from outside the disk drive base via the opening. The laminated electrical connector has an adhesive layer that is adhered to the disk drive base continuously around the opening, and that has a hole therethrough that is aligned with the opening. The laminated electrical connector includes electrically conductive traces that are electrically connected to the actuator flex cable, and a first insulative layer that is disposed on the trace layer. The laminated electrical connector has a metal foil sealing layer that continuously spans and completely covers the opening, and that has no holes therethrough that are aligned with the opening. The metal foil sealing layer overlaps the adhesive layer continuously around the opening.

16 Claims, 7 Drawing Sheets

U.S. PATENT DOCUMENTS

| | | |
|---|---|---|
| 2007/0035872 A1 | 2/2007 | Hayakawa et al. |
| 2007/0183085 A1 | 8/2007 | Hatchett et al. |
| 2007/0263319 A1 | 11/2007 | Calderon et al. |
| 2008/0007866 A1 | 1/2008 | Hayakawa et al. |
| 2008/0068745 A1 | 3/2008 | Uefune et al. |
| 2008/0165448 A1 | 7/2008 | Ichikawa et al. |
| 2008/0165449 A1 | 7/2008 | Shindo et al. |
| 2009/0097163 A1 | 4/2009 | Suzuki et al. |
| 2009/0102131 A1 | 4/2009 | Gunderson |
| 2009/0168233 A1 | 7/2009 | Kouno et al. |
| 2009/0241322 A1 | 10/2009 | Uefune et al. |

SEALED LAMINATED ELECTRICAL CONNECTOR FOR HELIUM FILLED DISK DRIVE

FIELD OF THE INVENTION

The present invention relates generally to information storage devices, and in particular to hermetically sealed disk drive information storage devices containing helium.

BACKGROUND

The typical hard disk drive includes a head disk assembly (HDA) and a printed circuit board assembly (PCBA) attached to a disk drive base of the HDA. The HDA includes at least one disk (such as a magnetic disk, magneto-optical disk, or optical disk), a spindle motor for rotating the disk, and a head stack assembly (HSA). The PCBA includes electronics and firmware for controlling the rotation of the spindle motor and for controlling the position of the HSA, and for providing a data transfer channel between the disk drive and its host.

The spindle motor typically includes a rotor including one or more rotor magnets and a rotating hub on which disks are mounted and clamped, and a stator. If more than one disk is mounted on the hub, the disks are typically separated by spacer rings that are mounted on the hub between the disks. Various coils of the stator are selectively energized to form an electromagnetic field that pulls/pushes on the rotor magnet(s), thereby rotating the hub. Rotation of the spindle motor hub results in rotation of the mounted disks.

The HSA typically includes an actuator, at least one head gimbal assembly (HGA), and a flex cable assembly. During operation of the disk drive, the actuator must rotate to position the HGAs adjacent desired information tracks on the disk. The actuator includes a pivot-bearing cartridge to facilitate such rotational positioning. The pivot-bearing cartridge fits into a bore in the body of the actuator. One or more actuator arms extend from the actuator body. An actuator coil is supported by the actuator body, and is disposed opposite the actuator arms. The actuator coil is configured to interact with one or more fixed magnets in the HDA, to form a voice coil motor. The PCBA provides and controls an electrical current that passes through the actuator coil and results in a torque being applied to the actuator.

Each HGA includes a head for reading and writing data from and to the disk. In magnetic recording applications, the head typically includes a slider and a magnetic transducer that comprises a writer and a read element. In optical recording applications, the head may include a minor and an objective lens for focusing laser light on to an adjacent disk surface. The slider is separated from the disk by a gas lubrication film that is typically referred to as an "air bearing." The term "air bearing" is common because typically the lubricant gas is simply air. However, air bearing sliders have been designed for use in disk drive enclosures that contain helium, because an inert gas may not degrade lubricants and protective carbon films as quickly as does oxygen. Helium may also be used, for example, because it has higher thermal conductivity than air, and therefore may improve disk drive cooling. Also, because the air bearing thickness depends on the gas viscosity and density, the air bearing thickness may be advantageously reduced in helium relative to air (all other conditions being the same). Furthermore, because helium has lower density than air, its flow (e.g. flow that is induced by disk rotation) may not buffet components within the disk drive as much, which may reduce track misregistration and thereby improve track following capability—facilitating higher data storage densities.

Disk drive enclosures disclosed in the art to contain helium are typically hermetically sealed to prevent an unacceptable rate of helium leakage. Although some negligible amount of helium leakage is unavoidable, a non-negligible amount of helium leakage is undesirable because it can alter the thickness of the gas lubrication film between the head and the disk, and thereby affect the performance of the head. A non-negligible amount of helium leakage is also undesirable because it can alter the tribochemistry of the head disk interface, possibly leading to degradation in reliability, head crashes, and associated data loss.

One challenge in the design and manufacture of disk drive enclosures that contain helium is to facilitate electrical communication between the inside and outside of the disk drive enclosure while retaining helium internal to the disk drive enclosure for sufficient time to ensure adequate product reliability. Also, such electrical communication may be adversely affected by electromagnetic noise that may be received by the conductors across which such electrical communication takes place. Thus, there is a need in the art for disk drive enclosure sealing methods and structures that can facilitate electrical communication between the interior and exterior of the disk drive, and that can retain helium internal to a disk drive enclosure for a sufficient period of time to ensure adequate post-manufacture product reliability and lifetime. There is also a need in the art for methods and structures that can improve shielding of such electrical communication from electromagnetic noise sources.

SUMMARY

A novel disk drive includes a hermetically sealed enclosure including a disk drive base and a top cover attached to the disk drive base. The enclosure is helium-filled and has an opening extending through the disk drive base. A spindle motor is attached to the disk drive base. A head actuator is disposed in the enclosure and includes a voice coil motor. A flex cable is disposed in the enclosure and is attached to the head actuator. The flex cable is electrically connected to the voice coil motor. A laminated electrical connector is disposed inside the enclosure. The laminated electrical connector spans the opening and is accessible from outside the disk drive base via the opening. The laminated electrical connector has an adhesive layer adhered to the disk drive base continuously around the opening. The adhesive layer has a hole therethrough that is aligned with the opening. The laminated electrical connector has a trace layer that includes electrically conductive traces that are electrically connected to the flex cable, and a first insulative layer that is disposed on the trace layer. The laminated electrical connector has a metal foil sealing layer that continuously spans and completely covers the opening. The metal foil sealing layer has no holes therethrough that are aligned with the opening. The metal foil sealing layer overlaps the adhesive layer continuously around the opening. The trace layer and the first insulative layer are disposed between the metal foil sealing layer and the adhesive layer. The laminated electrical connector also has a stiffener layer, the metal foil sealing layer being disposed between the stiffener layer and the adhesive layer.

DESCRIPTION OF THE PREFERRED EMBODIMENTS

Figure 1:
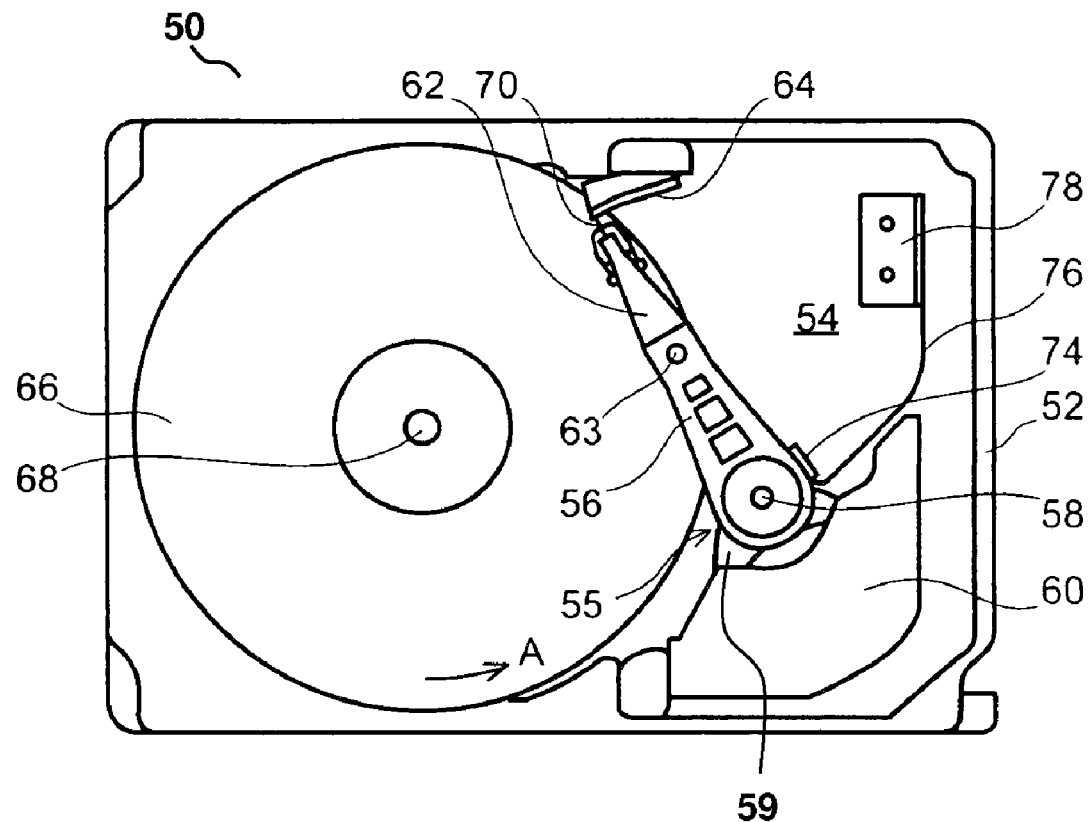
FIG. 1 depicts a disk drive according to the prior art.

FIG. 1 is a plan view showing a schematic drawing of a magnetic disk drive 50 according to the prior art. A disk drive base 52 together with an adjoining top cover (not shown to enable viewing of internal components) forms a disk drive enclosure 54. Enclosed within the disk drive enclosure 54 is a head gimbal assembly (HGA) 62 that includes a read/write head that can be loaded and unloaded from the surface of a disk 66 by the interaction between a load tang 70 and a ramp 64. The disk 66, also enclosed within the disk drive enclosure 54, is mounted on a spindle motor 68 that is attached to the disk drive base 52 and that enables the disk 66 to rotate as indicated by arrow A. HGA 62 is attached to an actuator arm 56, for example by swaging at hole 63. Actuator arm 56 pertains to a head actuator 55, which is disposed in the disk drive enclosure 54, and which pivots about pivot bearing cartridge 58 in response to a torque from a voice coil motor 59. The torque is created by an electromagnet interaction between the voice coil motor 59 and a static magnetic field provided by a permanent magnet assembly 60.

A circuit board (not shown) for controlling operation of the magnetic disk drive 50, and for enabling data communications between the magnetic disk drive 50 and an external host, is mounted on the bottom of the disk drive base 52. The electrical path between the circuit board and read/write head of HGA 62 includes a flex cable 76 that is disposed within the disk drive enclosure 54. The flex cable 76 is attached to the head actuator 55 and to a flex bracket 78. The flex bracket 78 is positioned near an opening that extends through the disk drive base 52. The flex cable 76 is electrically connected to the voice coil motor 59, and may include a preamplifier 74.

Figure 2:
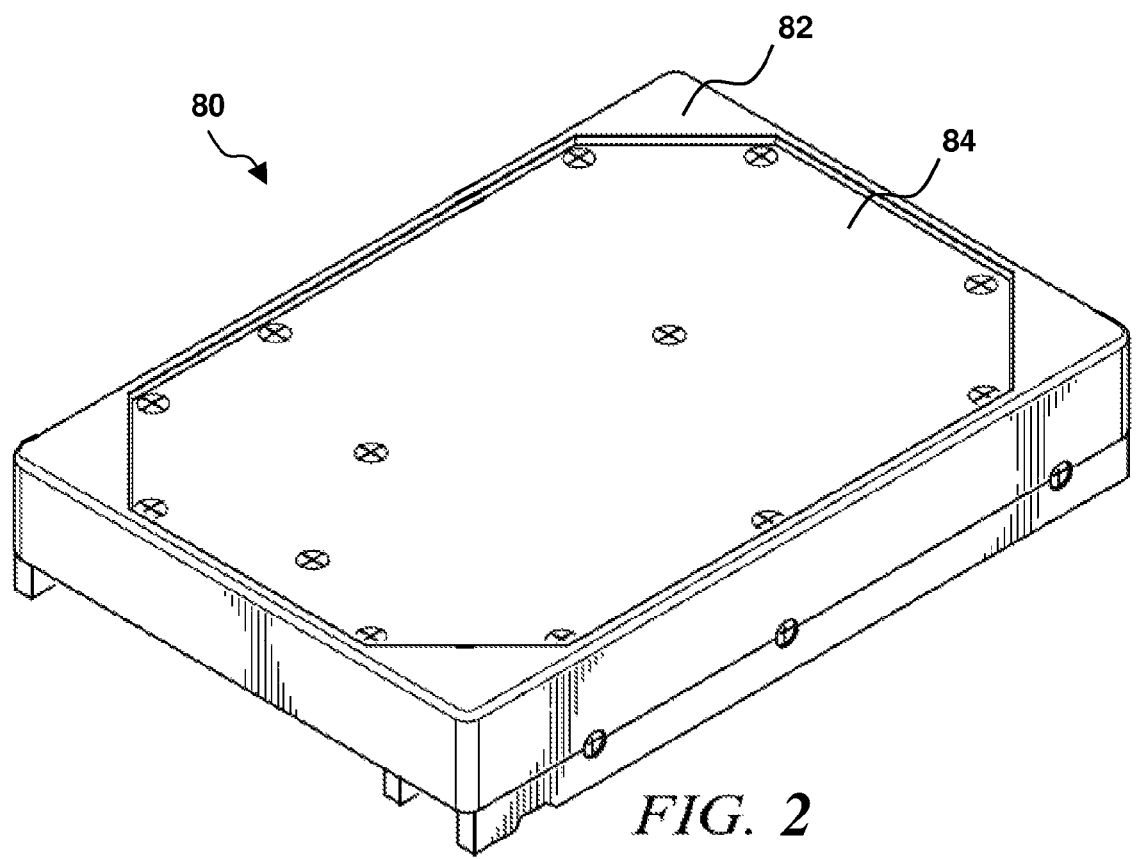
FIG. 2 is a perspective view of a disk drive capable of including an embodiment of the present invention.

FIG. 2 is a perspective view of a disk drive 80 capable of including an embodiment of the present invention. Disk drive 80 includes a disk drive enclosure that includes a disk drive base 82 and a top cover 84 attached to the disk drive base 82 (by a plurality of screw fasteners in the embodiment of FIG. 2).

Figure 3:
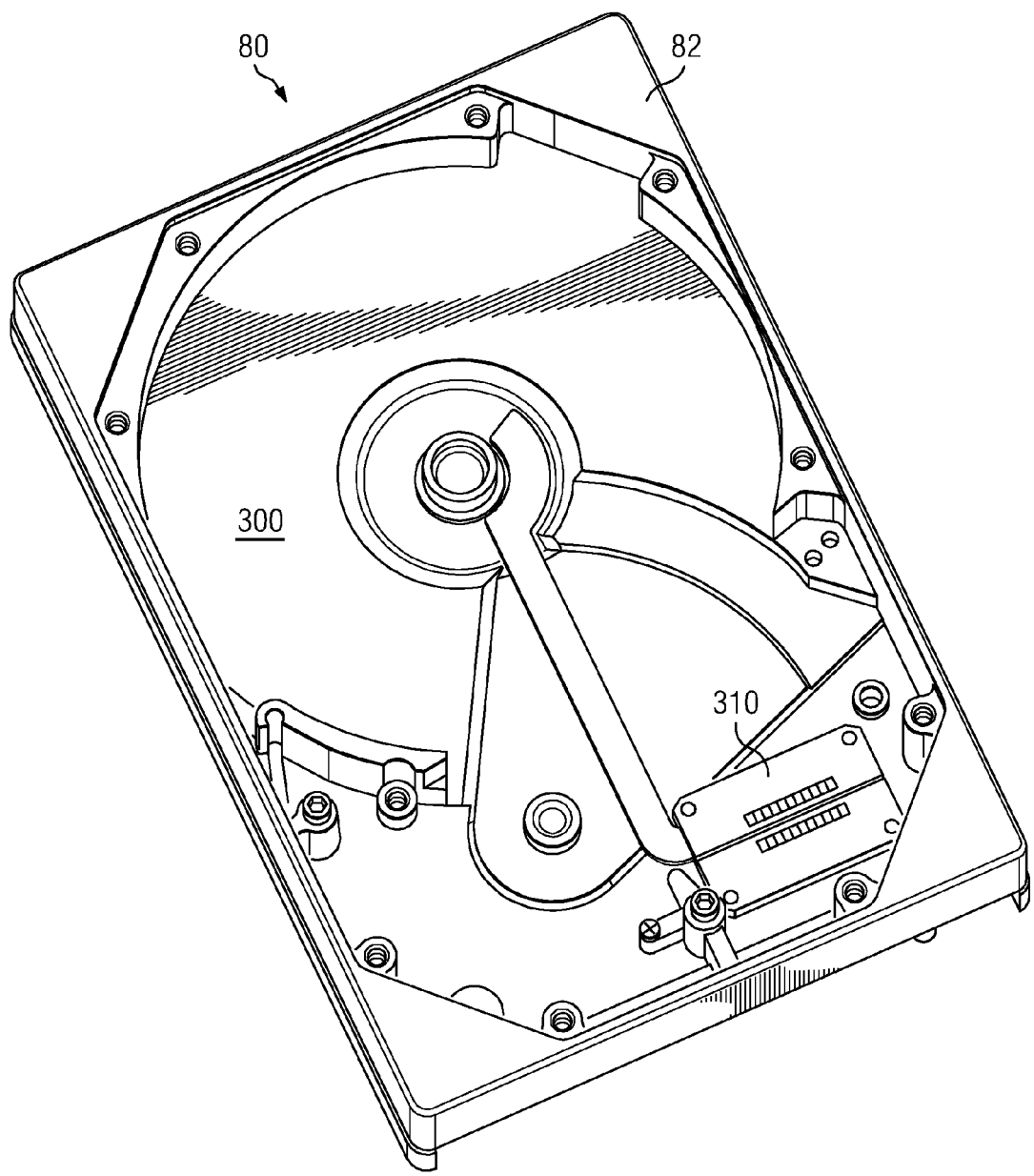
FIG. 3 is a top perspective view of a disk drive enclosure according to an embodiment of the present invention, with the top cover removed to permit viewing inside.

FIG. 3 is a top perspective view of the disk drive enclosure 300 of the disk drive 80, according to an embodiment of the present invention. FIG. 3 depicts the disk drive enclosure 300 of disk drive 80 with its top cover 84 removed, to permit viewing inside the disk drive enclosure 300. The disk drive enclosure 300 would otherwise be helium-filled (i.e. enclose a substantial concentration of helium gas) and hermetically sealed. Also, FIG. 3 depicts the disk drive enclosure 300 with several internal components removed (e.g. disk, head actuator, flex cable, and permanent magnets) to provide a less obstructed view of a novel laminated electrical connector 310 that is disposed inside the disk drive enclosure 300.

Practically, the concentration of enclosed helium gas (e.g. versus remaining air) will be less than 100% initially, and is expected to drop over the useful life of the disk drive 80. Still, the disk drive 80 may be considered "helium-filled" throughout its useful life so long as it continues to enclose a substantial concentration of helium gas. Note also that 1.0 atmosphere pressure of helium is not required for the disk drive 80 to be considered "helium-filled". For example, the helium-filled disk drive enclosure preferably initially encloses helium having between 0.3 to 1.0 atmosphere partial pressure, and may also enclose air having between 0 to 0.7 atmosphere partial pressure. In certain applications, it may be desirable for at least 70% of the helium gas that is initially enclosed to remain enclosed after a 10 year useful life of the hermetically sealed disk drive.

Figure 4:
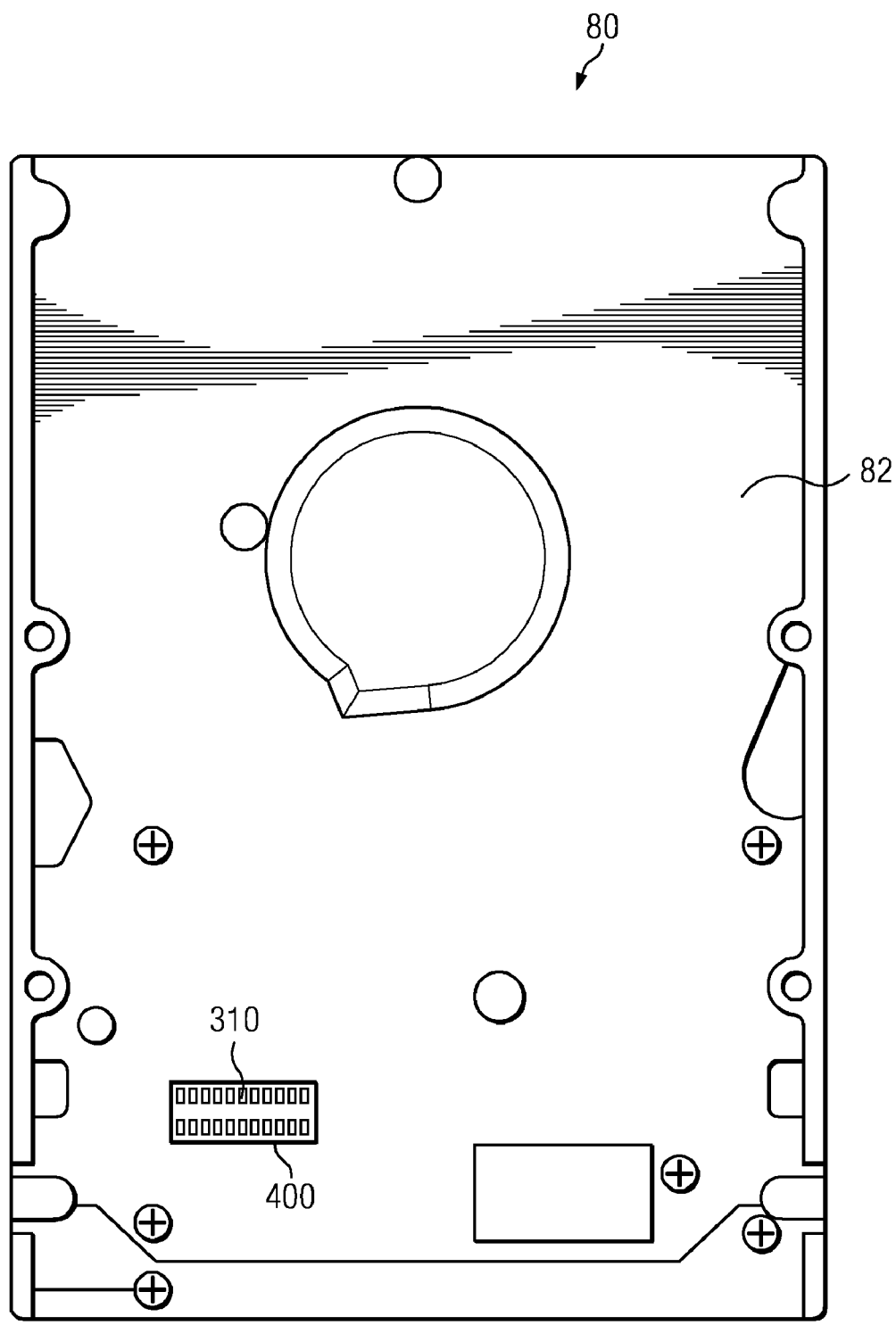
FIG. 4 is a bottom plan view of a disk drive according to an embodiment of the present invention.

FIG. 4 is a bottom plan view of the disk drive 80. Now referring additionally to FIG. 4, from the underside of disk drive 80 an opening 400 can be seen. The opening 400 extends through the disk drive base 82 to the disk drive enclosure 300. The laminated electrical connector 310 spans the opening 400 and is accessible from outside the disk drive base 82 from underneath via the opening 400.

Figure 5:
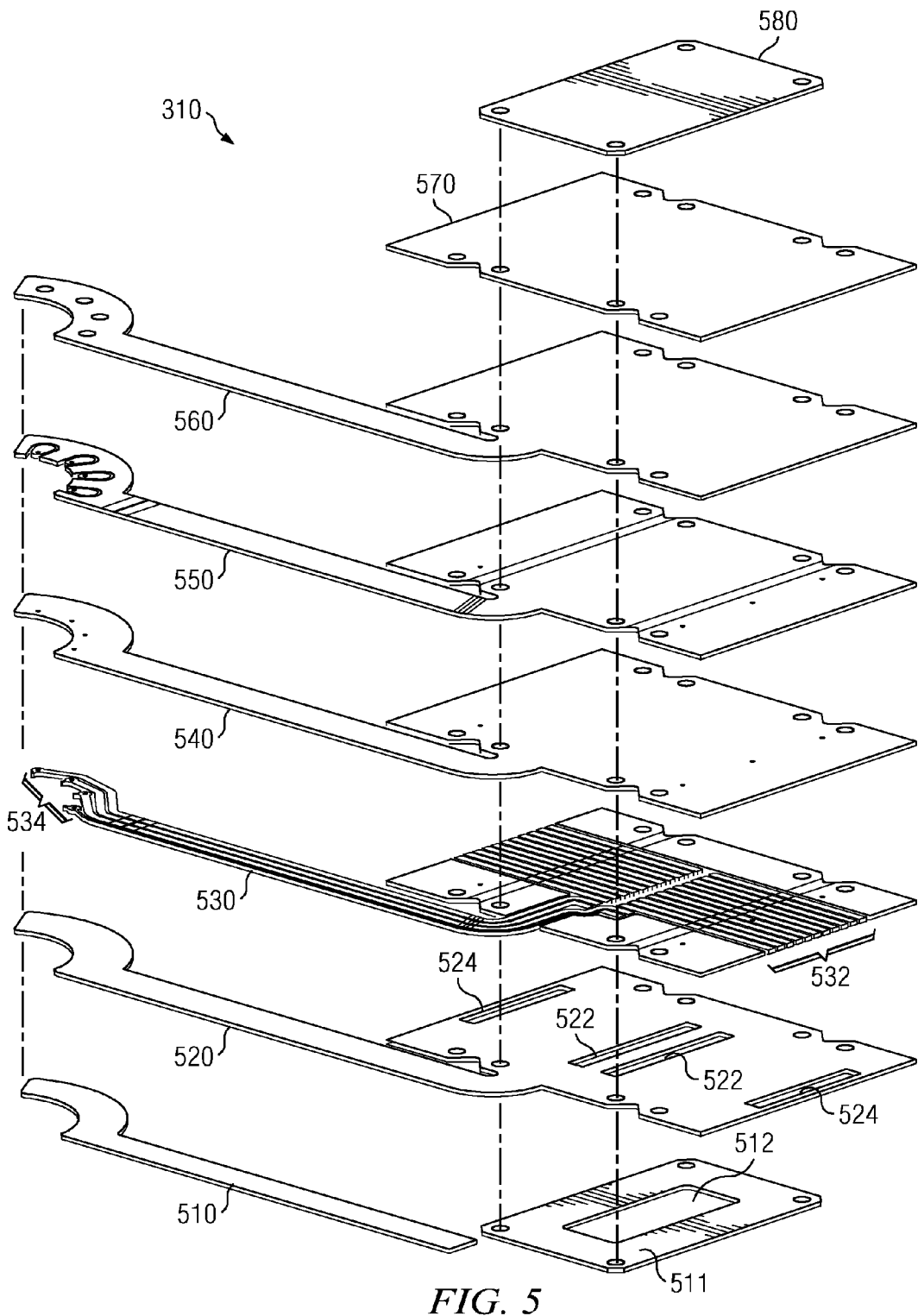
FIG. 5 is an exploded perspective view of a laminated electrical connector according to an embodiment of the present invention.

FIG. 5 is an exploded perspective view of a laminated electrical connector 310 according to an embodiment of the present invention. Now referring additionally to FIG. 5, the laminated electrical connector 310 includes a first adhesive layer 511 adhered to the disk drive base 82 continuously around the opening 400. For example, the first adhesive layer 511 may be a layer of thermal set epoxy adhesive or acrylic adhesive, and may define an adhesive layer thickness in the range 25 to 50 microns. The laminated electrical connector 310 also includes an adhesive tail 510 adhered to the disk drive base 82.

In the embodiment of FIG. 5, the first adhesive layer 511 has a hole 512 therethrough that is aligned with the opening 400, so that the laminated connector 310 can be accessed from underneath and outside the disk drive 80 (via the opening 400 and the hole 512). In this context, "aligned with" merely means that the hole 512 and the opening 400 overlap sufficiently to allow access to one or more further layers (described next) of the laminated connector 310 via the hole 512 and the opening 400.

Also in the embodiment of FIG. 5, the laminated electrical connector 310 includes a trace layer 530 that includes a plurality of electrically conductive traces 532. The plurality of electrically conductive traces 532 includes traces that are electrically connected to a flex cable (e.g. flex cable 76) internal to the disk drive enclosure 300. For example, the trace layer 530 may comprise a copper foil that is approximately 12 microns thick. Also in the embodiment of FIG. 5, the laminated electrical connector 310 includes a first insulative layer 540 disposed on the trace layer 530. For example, the first insulative layer 540 may be a polyimide layer having a thickness in the range 10 to 50 microns. Optionally, the first insulative layer 540 may also include its own adhesive layer in addition to such a polyimide layer.

The laminated electrical connector 310 also includes a metal foil sealing layer 550 (e.g. copper foil, aluminum foil, stainless steel foil, etc) that continuously spans and completely covers the opening 400. Preferably, the metal foil sealing layer 550 defines a metal foil thickness in the range 12 to 50 microns, which may advantageously reduce the likelihood of small pores or defects aligning or extending through the metal foil sealing layer 550. Note that the metal foil sealing layer 550 has no holes therethrough that are aligned with the opening 400. Also, the metal foil sealing layer 550 overlaps the first adhesive layer 511 continuously around the opening 400. FIG. 5 also shows that the trace layer 530 and the first insulative layer 540 are disposed between the metal foil sealing layer 550 and the first adhesive layer 511.

The metal foil sealing layer 550 described above may advantageously reduce the diffusion of helium through the laminated electrical connector 310, both vertically by blocking diffusion in that direction, and horizontally by constraining the horizontal diffusion (e.g. laterally through the first insulative layer 540 and/or the first adhesive layer 511) to occur through a path having a narrow aspect ratio (horizontal path length relative to path height).

Optionally, the laminated electrical connector 310 may also include a second insulative layer 520 that is disposed between the trace layer 530 and the first adhesive layer 511 (as shown in the embodiment of FIG. 5). In that case, the trace layer 530 is affixed to the disk drive base 82 via the second insulative layer 520 (and the first adhesive layer 511 and the adhesive tail 510). For example, the second insulative layer 520 may comprise a polyimide layer having a thickness in the range 10 to 50 microns. Alternatively the second insulative layer 520 may comprise a solder resist layer that is silk screened onto a second metal foil, with the second insulative layer 520 oriented so that the second metal foil faces the first adhesive layer 511. Such a second metal foil, regardless of the composition of the second insulative layer 520, could enhance electromagnetic shielding and advantageously increase the length of the gas diffusion path, especially after the laminated electrical connector 310 is folded (as described later herein).

In the embodiment of FIG. 5, the second insulative layer 520 includes windows 522 and 524. Windows 522 permit access to the plurality of electrically conductive traces 532 of the trace layer 530 through the second insulative layer 520, from beneath and outside the disk drive 80 via opening 400. Windows 524 permit the plurality of electrically conductive traces 532 of the trace layer 530 to be accessed through the second insulative layer 520, from above and within the disk drive enclosure 300—after the laminated electrical connector 310 is folded in a way that is similar to the folding of the laminated electrical connector 600 shown in FIGS. 6A, 6B, 6C and described later herein.

In the embodiment of FIG. 5, the laminated electrical connector 310 also includes a stiffener layer 580. Preferably but not necessarily, the stiffener layer 580 may be a metal stiffener layer. In certain embodiments, the laminated electrical connector 310 may also include a third insulative layer 560 disposed between the metal foil sealing layer 550 and the stiffener layer 580. The stiffener layer 580 may be fabricated from stainless steel, aluminum, or plastic, for example. Optionally, the stiffener layer 580 defines a stiffener layer thickness in the range 0.25 to 3 mm. Such a stiffener layer may provide mechanical stiffness to the laminated electrical connector 310. Note that, in the embodiment of FIG. 5, the metal foil sealing layer 550 is disposed between the stiffener layer 580 and the first adhesive layer 511. Optionally, a second adhesive layer 570 may be disposed between the stiffener layer 580 and the metal foil sealing layer 550, as shown in the embodiment of FIG. 5. For example, the second adhesive layer 570 may be a layer of thermal set epoxy adhesive having a thickness in the range 25 to 50 microns.

In the embodiment of FIG. 5, the plurality of electrically conductive traces 532 preferably includes a second subset of electrically conductive traces 534 that extends to and connects to a plurality of electrical terminals of the spindle motor (e.g. spindle motor 68). This second subset of electrically conductive traces is seen in FIG. 5 to extend over the adhesive tail 510. Also in the embodiment of FIG. 5, the metal foil sealing layer 550 optionally extends along and completely covers the second subset of electrically conductive traces 534. This may provide an advantageous additional electromagnetic shielding of the second subset of electrically conductive traces 534.

Figure 6A:
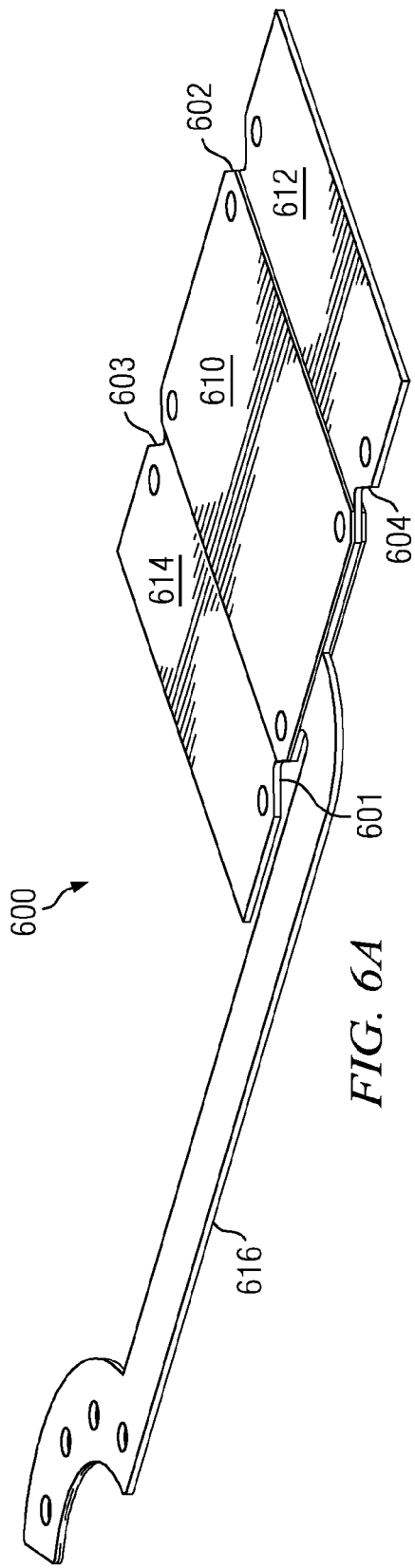
FIG. 6A is a perspective view of a laminated electrical connector according to an embodiment of the present invention, before folding.

FIG. 6A is a perspective view of a laminated electrical connector 600 according to an embodiment of the present invention, before folding. The laminated electrical connector 600 includes a middle portion 610 and two wing portions 612, 614, though optionally a single wing portion could be used. The laminated electrical connector 600 also preferably includes a tail portion 616. Preferably but not necessarily, the laminated electrical connector 600 includes a plurality of notches 601, 602, 603, and 604.

Figure 6B:
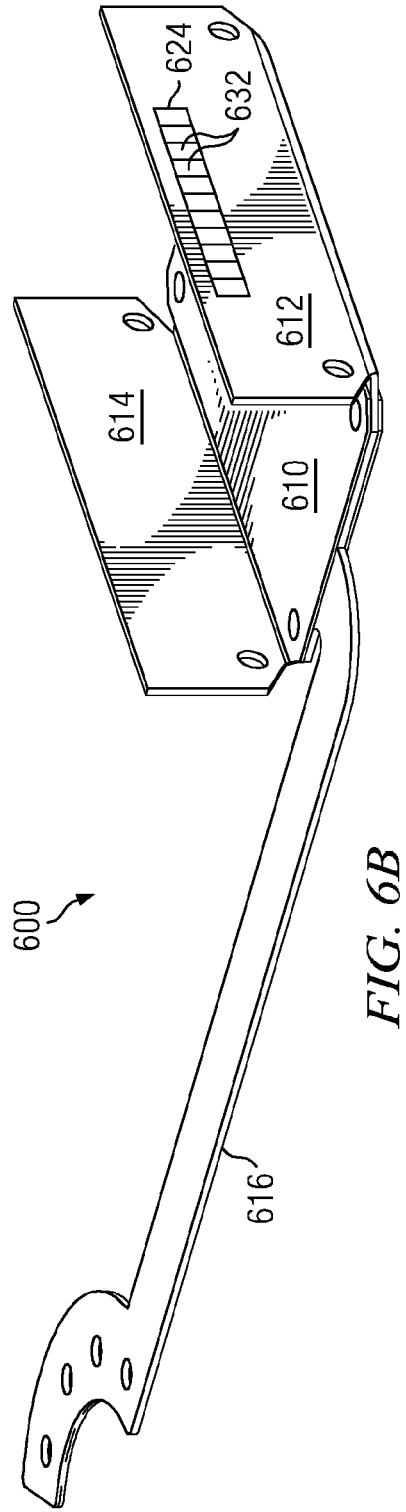
FIG. 6B is a perspective view of a laminated electrical connector according to an embodiment of the present invention, during folding.
Figure 6C:
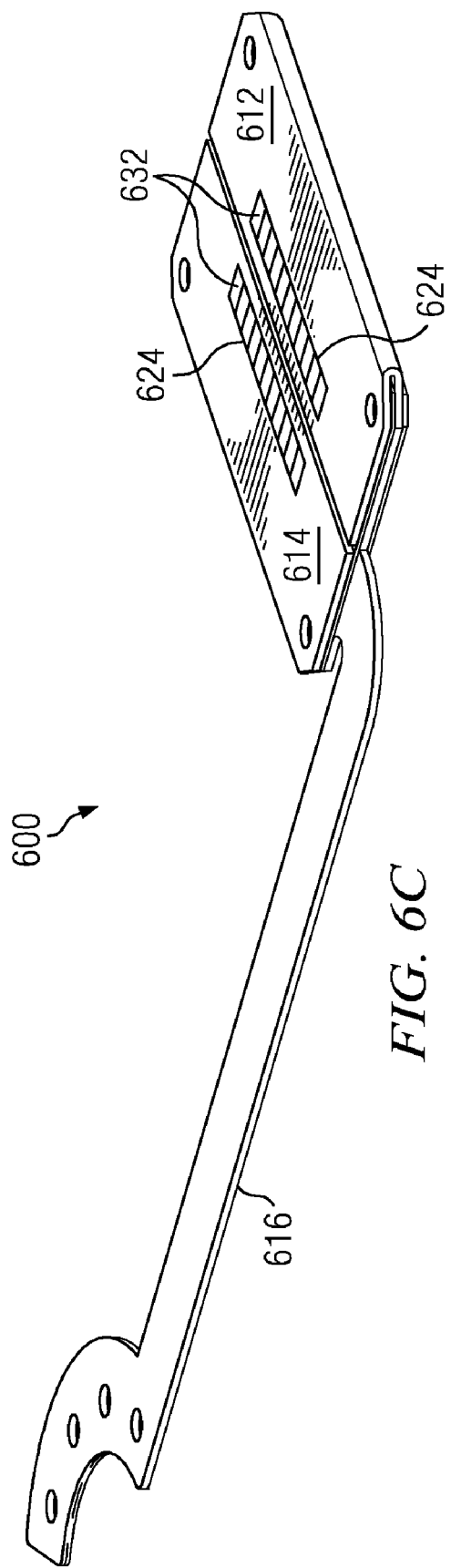
FIG. 6C is a perspective view of a laminated electrical connector according to an embodiment of the present invention, after folding.

FIG. 6B is a perspective view of the laminated electrical connector 600, during folding. Now referring additionally to FIG. 6B, the wing portions 612, 614 are preferably folded along creases that are approximately aligned with the notches 601, 602, 603, and 604. In the view of FIG. 6B, a window 624 in the second insulative layer of the laminated electrical connector 600 permits viewing of a portion of the surfaces of its plurality of electrically conductive traces 632. FIG. 6C is a perspective view of the laminated electrical connector 600, after folding. Folding the laminated electrical connector 600 in this way may permit a portion of its plurality of electrically conductive traces 632 to be accessible from the top, via windows 624 in the second insulative layer of the laminated electrical connector 600.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. "Comprising," "including," and "having," are intended to be open-ended terms.

We claim:

1. A disk drive comprising:
    a hermetically sealed enclosure including a disk drive base and a top cover attached to the disk drive base, the enclosure being helium-filled and having an opening extending through the disk drive base;
    a spindle motor attached to the disk drive base;
    a head actuator disposed in the enclosure and including a voice coil motor;
    a flex cable being disposed in the enclosure and being attached to the head actuator, the flex cable being electrically connected to the voice coil motor; and
    a laminated electrical connector disposed inside the enclosure, the laminated electrical connector spanning the opening and being accessible from outside the disk drive base via the opening, the laminated electrical connector comprising a plurality of layers, the plurality of layers including
        an adhesive layer adhered to the disk drive base continuously around the opening, the adhesive layer having a hole therethrough that is aligned with the opening;

a trace layer that includes a plurality of electrically conductive traces including a first subset of electrically conductive traces that are electrically connected to the flex cable;

a first insulative layer disposed on the trace layer;

a metal foil sealing layer that continuously spans and completely covers the opening, the metal foil sealing layer having no holes therethrough that are aligned with the opening, the metal foil sealing layer overlapping the adhesive layer continuously around the opening, the trace layer and the first insulative layer being disposed between the metal foil sealing layer and the adhesive layer; and a stiffener layer, the metal foil sealing layer being disposed between the stiffener layer and the adhesive layer.

2. The disk drive of claim 1 further comprising a second insulative layer that is disposed between the trace layer and the adhesive layer, and wherein the trace layer is affixed to the disk drive base via the second insulative layer.

3. The disk drive of claim 1 wherein the stiffener layer is a metal stiffener layer.

4. The disk drive of claim 1, wherein the spindle motor includes a plurality of electrical terminals, and wherein the plurality of electrically conductive traces includes a second subset of electrically conductive traces that extends to and connects to the plurality of electrical terminals.

5. The disk drive of claim 4 wherein the metal foil sealing layer extends to the plurality of electrical terminals and completely covers the second subset of electrically conductive traces.

6. The disk drive of claim 1 wherein the metal foil sealing layer comprises copper foil.

7. The disk drive of claim 1 wherein the adhesive layer defines an adhesive layer thickness in the range 25 to 50 microns.

8. The disk drive of claim 1 wherein the metal foil sealing layer defines a metal foil thickness in the range 12 to 50 microns.

9. The disk drive of claim 1 wherein the stiffener layer defines a stiffener layer thickness in the range 0.25 to 3 mm.

10. The disk drive of claim 1 wherein the first insulative layer comprises polyimide having a thickness in the range 10 to 50 microns.

11. The disk drive of claim 1 wherein the adhesive layer comprises an epoxy adhesive.

12. The disk drive of claim 1 wherein the laminated electrical connector includes a middle portion and at least one wing portion, and wherein the wing portion is folded over the middle portion.

13. The disk drive of claim 2 wherein the second insulative layer is on a second metal foil that faces the adhesive layer.

14. The disk drive of claim 2 wherein the laminated electrical connector includes a middle portion and at least one wing portion, and wherein the wing portion is folded over the middle portion.

15. The disk drive of claim 14 wherein the second insulative layer includes at least one window therethrough and over a portion of the trace layer.

16. The disk drive of claim 3 further comprising a third insulative layer disposed between the metal foil sealing layer and the metal stiffener layer.

* * * * *